ROBERT DOUGLAS.
Improvement in Machines for Making Cop-Tubes.
No. 126,192. Patented April 30, 1872.
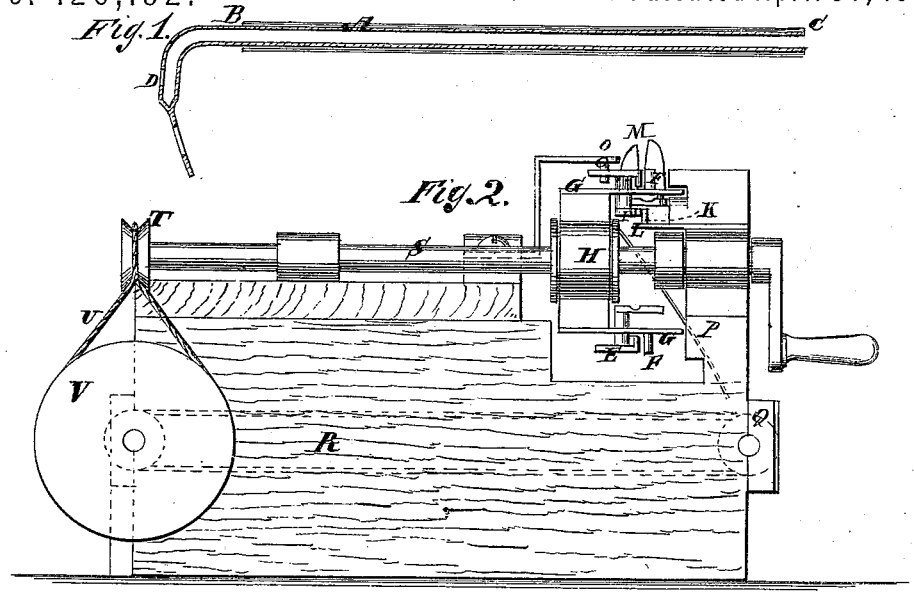

UNITED STATES PATENT OFFICE.

ROBERT DOUGLAS, OF LOWELL, MASSACHUSETTS, ASSIGNOR TO HIMSELF AND JAMES DOUGLASS, OF SAME PLACE.

IMPROVEMENT IN MACHINES FOR MAKING COP-TUBES.

Specification forming part of Letters Patent No. 126,192, dated April 30, 1872.

Specification describing a new and Improved Cop-Tube Machine, invented by ROBERT DOUGLAS, of Lowell, in the county of Middlesex and State of Massachusetts.

The first part of the invention consists in a novel construction of the carrying and cutting apparatus, whereby the tube is drawn from the mandril on which it is formed, cut into the proper lengths for carrying to the drying apparatus, and delivered thereto; and the second part consists in the arrangement of the said cutting and carrying apparatus with reference to the drying apparatus, all substantially as specified.

Figure 1 is a view of the mandrel on which the tubes are formed, partly in section and partly in side elevation. Fig. 2 is a side elevation of the carrying, cutting, and drying apparatus. Fig. 3 is a plan view of Fig. 2, also of a part of the mandrel.

Similar letters of reference indicate corresponding parts.

A represents the mandrel, on which a continuous paper tube is formed by bending a paper strip upon it and pasting the edges, which are lapped between the point, where the said tube is supported and the end C, from which the tube is continuously drawn, all being done by suitable grooved wheels, guides, and pasting apparatus, which it is not necessary to describe here for the purposes of this application. The liability of the tube thus formed to collapse as it is passed from the mandrel, in consequence of a partial vacuum formed therein for want of air to resist the external atmospheric pressure, is remedied by providing a hollow mandrel, having an opening, D, therein for the admission of air to the tube as it passes from the mandrel. From this mandrel the tube is received between a gripping-pawl, E, and a fixed griping-jaw, F, on a bar, G, carried by an endless belt, H, to be drawn from the mandrel, cut into suitable lengths for drying, and carried to the apparatus for conveying to the drier, the said pawl being caused to gripe the tube by the finger I coming in contact with the pin K, supported in the path of the said finger in any suitable way—say on an arm, L, projecting from the supporting frame. There are preferably three of these gripers on the belt H; also as many cutting-shears M just in advance of each griper, between the jaws or blades of which the tubes are drawn by the gripers in advance of them, and these shears are closed upon the tube by the bar or rod N, and cut it off immediately after the gripers behind have taken hold of the said tube. At the same time that the tube is cut the gripers in advance of the shears are opened by the pin O, and the piece of tube cut off falls upon the chute P, by which it is conducted to the endless carriers Q, to be conducted into the heating-chamber R. The belt H is operated by the driving-shaft S, which also drives the endless carriers Q by means of the pulleys T V and belt U. By this arrangement of the carrying and cutting devices the tube is griped by one griper and cut off before being released by the preceding one, thus having the carrying insured in a reliable and effective manner. The arrangement of the carrying and cutting devices at one side of the drying-chamber and over the endless carriers running through it, allows the cut pieces to be delivered to the said carrier by gravity, thus accomplishing the work simply and economically.

Having thus described my invention, I claim as new and desire to secure by Letters Patent—

1. The combination, with the tube-forming mandrel, of the endless carrying-belt H, gripers E F, and the shears M, all arranged and operating substantially as specified.

2. The carrying and cutting devices herein described, arranged with reference to the drying-chamber and endless carrier, as and for the purpose described.

ROBERT DOUGLAS.

Witnesses:
GEO. W. HUNTOON,
FRANK D. HUNTOON.